(12) United States Patent
Murakami et al.

(10) Patent No.: US 11,272,083 B2
(45) Date of Patent: Mar. 8, 2022

(54) IMAGE PICKUP APPARATUS

(71) Applicant: CANON KABUSHIKI KAISHA, Tokyo (JP)

(72) Inventors: Taro Murakami, Musashino (JP); Kiyoshi Nitto, Saitama (JP); Nobuyoshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 16/730,318

(22) Filed: Dec. 30, 2019

(65) Prior Publication Data
US 2020/0228691 A1    Jul. 16, 2020

(30) Foreign Application Priority Data
Jan. 10, 2019   (JP) .............................. JP2019-002257

(51) Int. Cl.
*H04N 5/225*     (2006.01)
*G03B 13/02*     (2021.01)
*G03B 17/04*     (2021.01)

(52) U.S. Cl.
CPC ......... *H04N 5/22525* (2018.08); *G03B 13/02* (2013.01); *G03B 17/04* (2013.01)

(58) Field of Classification Search
CPC ........... H04N 5/22525; H04N 5/23293; G03B 13/02; G03B 13/10; G03B 17/04
See application file for complete search history.

(56) References Cited

U.S. PATENT DOCUMENTS

2002/0196358 A1* 12/2002 Kim ..................... H04N 5/2251
                                                    348/333.06
2017/0187964 A1*  6/2017 Sato ................... H04N 5/23293
(Continued)

FOREIGN PATENT DOCUMENTS

JP        07-099598 A       4/1995
JP     2002-374442 A      12/2002
(Continued)

OTHER PUBLICATIONS

The above foreign patent documents were cited in the Oct. 6, 2020 Japanese Office Action, which is enclosed with an English Translation, that issued in Japanese Patent Application No. 2019-002257.

*Primary Examiner* — Noam Reisner
(74) *Attorney, Agent, or Firm* — Cowan, Liebowitz & Latman, P.C.

(57) ABSTRACT

An image pickup apparatus includes a lens barrel unit including an imaging optical system, a first cylindrical member, a second cylindrical member movable relative to the first cylindrical member along a guide bar between a retracted position and a pop-up position, a diopter adjuster provided on the second cylindrical member, a first detector configured to detect that the second cylindrical member is located at the retracted position or the pop-up position, and a first display unit. The guide bar is formed inside a projection surface of the first display unit when viewed from an optical axis direction. The first detection unit is fixed onto the first cylindrical member, and the first detector is more distant from the lens barrel unit than a reference line that passes a center of the first cylindrical member when viewed from the optical axis direction.

5 Claims, 12 Drawing Sheets

(56) References Cited

U.S. PATENT DOCUMENTS

2019/0107767 A1* 4/2019 Adachi ................ G03B 17/04
2020/0112660 A1* 4/2020 Nitto .................. H04N 5/23293

FOREIGN PATENT DOCUMENTS

| JP | 2003-143445 A | 5/2003 |
| JP | 3677991 B2 | 8/2005 |
| JP | 2015-227901 A | 12/2015 |
| JP | 2017-040798 A | 2/2017 |

* cited by examiner

IMAGE PICKUP APPARATUS

BACKGROUND OF THE INVENTION

Field of the Invention

The present invention relates to an image pickup apparatus having an electronic viewfinder.

Description of the Related Art

An image pickup apparatus that can house an electronic viewfinder in its main body has conventionally been known. Japanese Patent No. ("JP") 3677991 discloses a configuration in which a user pulls out and uses an electronic viewfinder retracted in a main body of an image pickup apparatus.

The configuration disclosed in JP 3677991 disposes two guide bars on an outer circumferential portion of an image display unit, and thus become large. JP 3677991 does not disclose a sensor that determines whether the electronic viewfinder is drawn or retracted. Simply disposing this sensor needs a wiring space, and thus causes the image pickup apparatus to be larger.

SUMMARY OF THE INVENTION

The present invention provides a compact image pickup apparatus having an electronic viewfinder.

An image pickup apparatus according to one aspect of the present invention includes a lens barrel unit including an imaging optical system, a first cylindrical member, a second cylindrical member movable relative to the first cylindrical member along a guide bar between a retracted position and a pop-up position, a diopter adjuster provided on the second cylindrical member, a first detector configured to detect that the second cylindrical member is located at the retracted position or the pop-up position, and a first display unit. The guide bar is formed inside a projection surface of the first display unit when viewed from an optical axis direction. The first detection unit is fixed onto the first cylindrical member, and the first detector is more distant from the lens barrel unit than a reference line that passes a center of the first cylindrical member when viewed from the optical axis direction.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
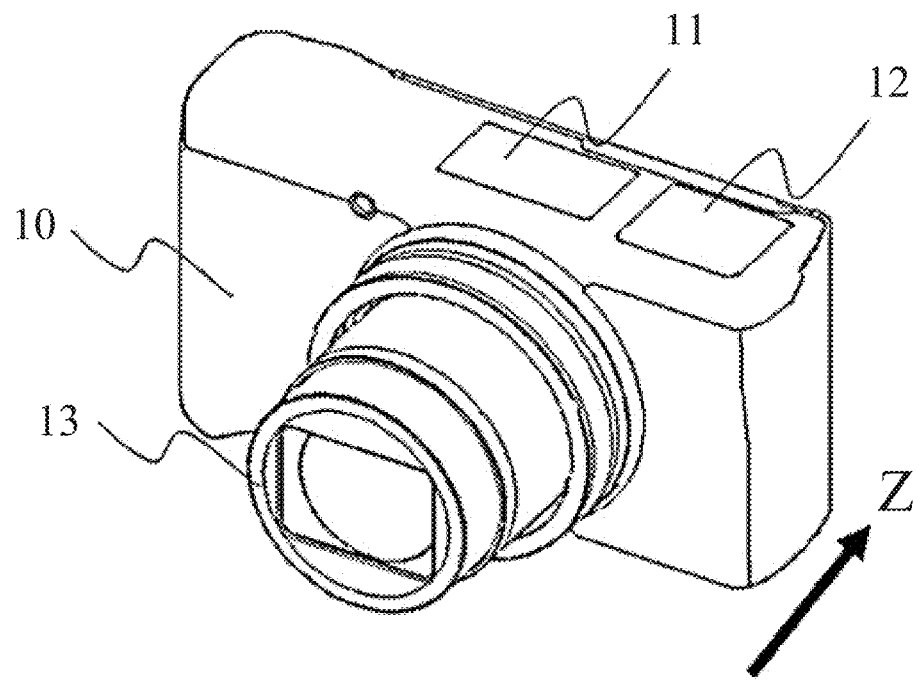
FIG. 1 is a perspective overview of a digital camera according to one embodiment (in a retracted state of a pop-up unit).
Figure 2:
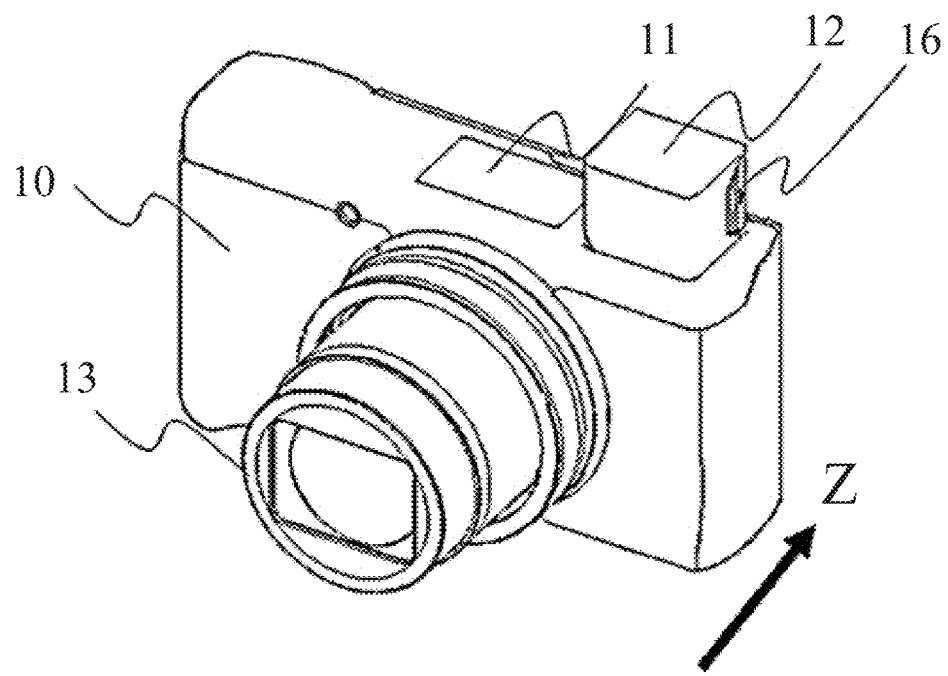
FIG. 2 is a perspective overview of the digital camera according to this embodiment (in a popped-up state of the pop-up unit).
Figure 3:
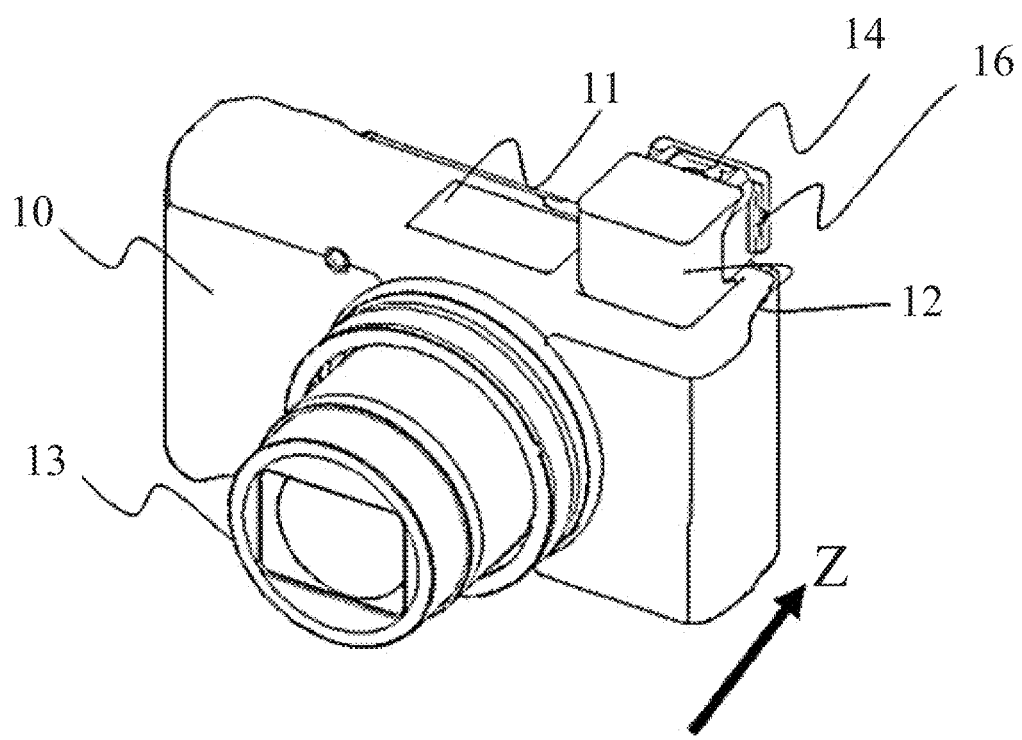
FIG. 3 is a perspective overview of the digital camera according to this embodiment (in a use or drawn state of the pop-up unit).

Referring now to FIGS. 1 to 3, a description will be given of a schematic configuration of a digital camera (image pickup apparatus) 10 according to this embodiment. FIGS. 1 to 3 are perspective overviews of the digital camera 10 viewed from the front side (object side). FIG. 1 illustrates a pop-up unit 12 including the electronic viewfinder unit 14 retracted in the main body of the digital camera 10 (retracted or housed state). FIG. 2 illustrates the pop-up unit 12 popping up from the main body of the digital camera 10 (popped-up state). FIG. 3 illustrates a use or drawn state where the electronic viewfinder unit 14 is enabled by drawing the electronic viewfinder unit 14 from the pop-up unit 12. In the following description, with respect to the Z axis facing the front-rear or depth direction of the digital camera 10, the lens barrel unit 13 side is defined as the front direction as the minus direction of the Z axis, and the plus direction of the Z axis is defined as the rear direction. The Z axis is parallel to the optical axis direction of the lens barrel unit 13.

The digital camera 10 includes a strobe unit 11, the pop-up unit 12 containing an electronic viewfinder unit 14, and a lens barrel unit 13. The state of the pop-up unit 12 transfers from the state retracted in the main body of the digital camera 10 (the retracted state illustrated in FIG. 1) to the state popping up from the main body of the digital camera 10 (the popped-up state illustrated in FIG. 2). A configuration in which the pop-up unit 12 is retracted in the main body of the digital camera 10 can make the digital camera 10 compact with a flat appearance surface.

The electronic viewfinder unit 14 is configured so that it can be retracted in and drawn from the pop-up unit 12 that has popped up from the main body of the digital camera 10. A fourth cylindrical member (eyepiece rubber portion or eyepiece portion) 16 exposed from the electronic viewfinder unit 14 can be pulled out toward the rear side (plus Z direction) of the digital camera 10. This configuration enables the electronic viewfinder unit 14 to be used or shift it to the use or drawn state illustrated in FIG. 3. In the use state, when the user adjusts the diopter with a diopter adjustment mechanism, the user confirms an image displayed on a display panel (first display unit) 36 provided in the electronic viewfinder unit 14 without any blurs.

In the digital camera 10, the pop-up unit 12 is thus shifted from the state retracted in the main body (the retracted state illustrated in FIG. 1) to the state popping up from the main body (the popped-up state illustrated in FIG. 2). The pop-up unit 12 shifts from the popped-up state to the enabled state (the use or drawn state illustrated in FIG. 3) by drawing the electronic viewfinder unit 14 to the rear side (plus Z direction) of the digital camera 10. This configuration can make the digital camera 10 compact.

Figure 4:
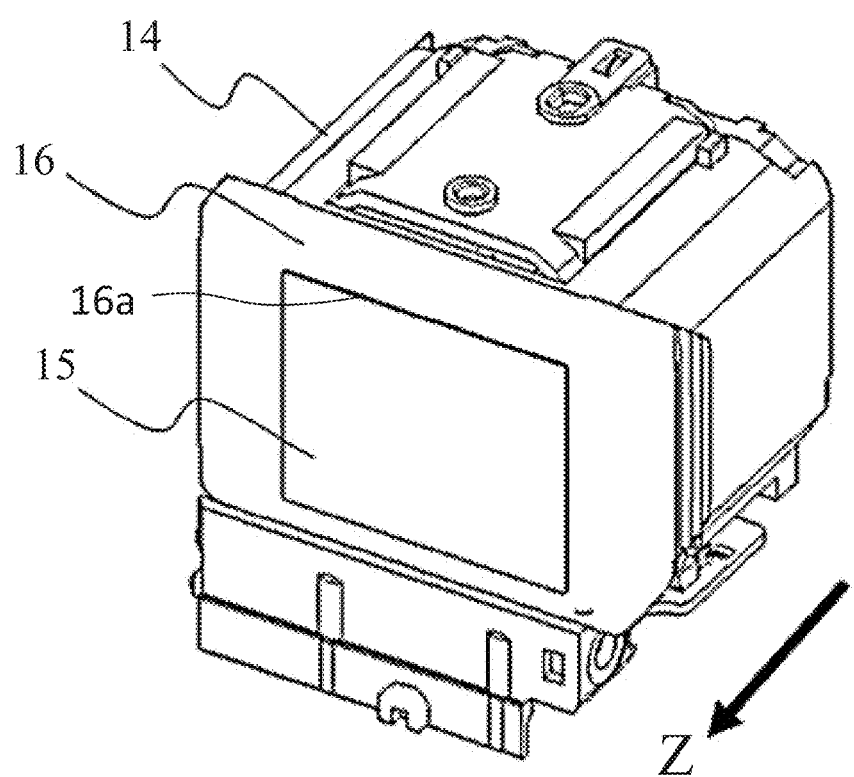
FIG. 4 is a perspective view of the electronic viewfinder unit in the retracted state (illustrated in FIGS. 1 and 2) according to this embodiment.
Figure 5:
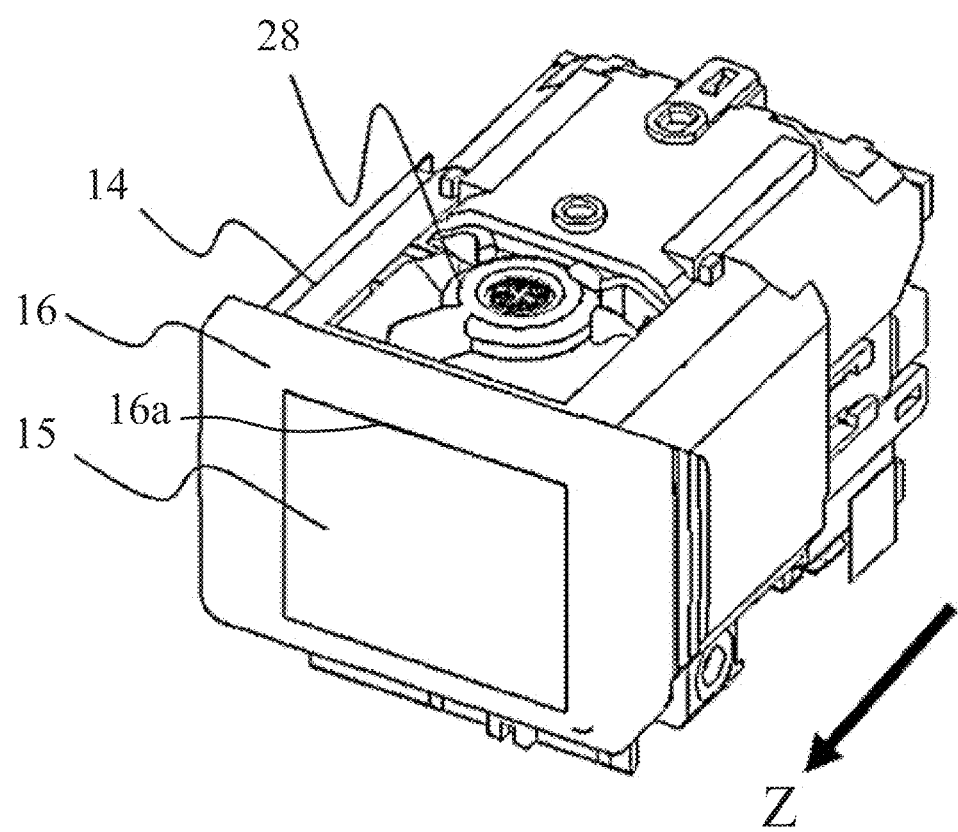
FIG. 5 is a perspective view of the electronic viewfinder unit according to this embodiment in the use or drawn state (illustrated in FIG. 3).

Referring now to FIGS. 4 to 11, a description will be given of a configuration of the electronic viewfinder unit 14. FIG. 4 is a perspective view of the electronic viewfinder unit 14 in the retracted state (illustrated in FIGS. 1 and 2). FIG. 5 is a perspective view of the electronic viewfinder unit 14 in the use or drawn state (illustrated in FIG. 3). A diopter adjustment lever 28 configured to adjust the diopter can be operated by changing the retracted state in FIG. 4 to the use or drawn state in FIG. 5. The configuration in which the diopter adjustment lever 28 is operable only in the use or drawn state can avoid the setting of the diopter from being unintentionally changed by the user. The diopter adjustment lever 28 is an operation member (diopter adjuster) for adjusting the diopter of the electronic viewfinder unit 14 according to the visual acuity of the user. The diopter adjustment lever 28 is provided on the upper surface side of the electronic viewfinder unit 14.

Figure 6:
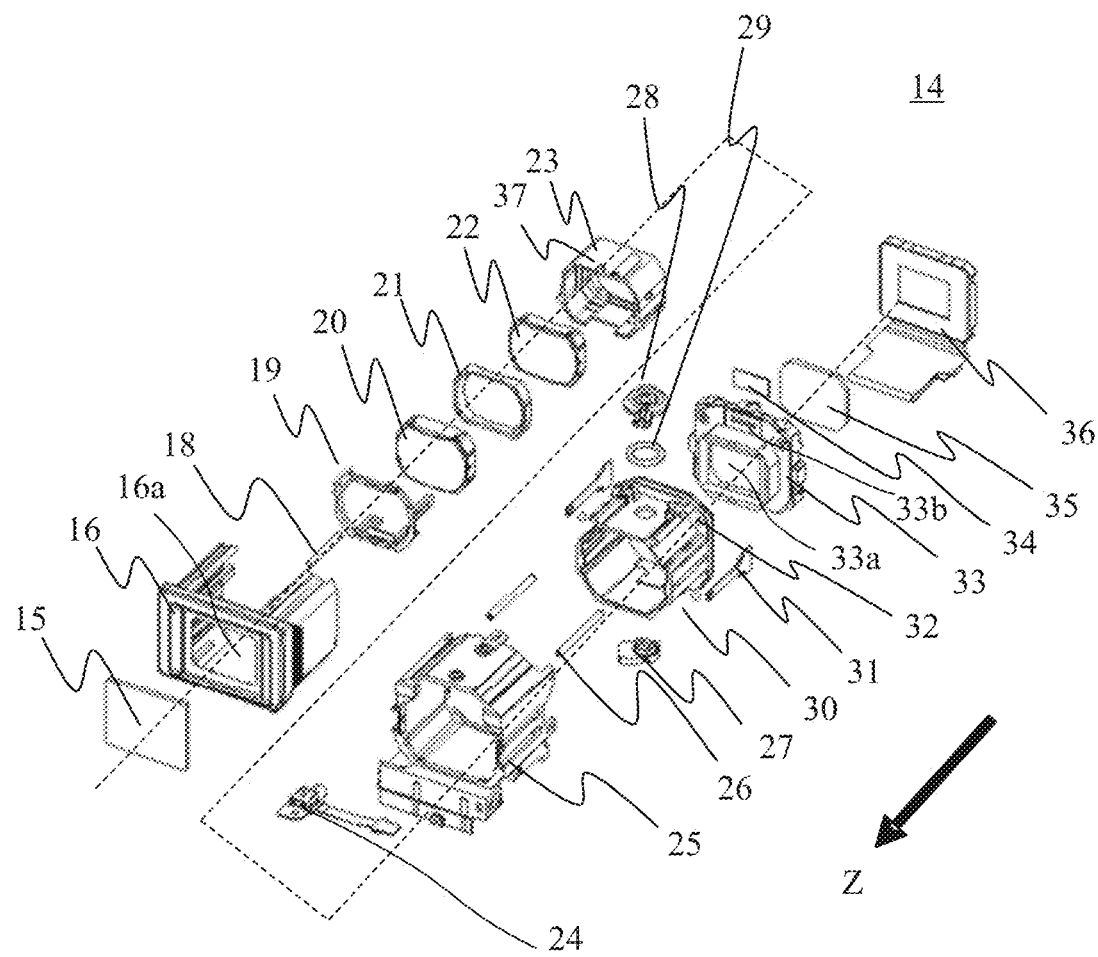
FIG. 6 is an exploded perspective view of the electronic viewfinder unit according to this embodiment.
Figure 7:
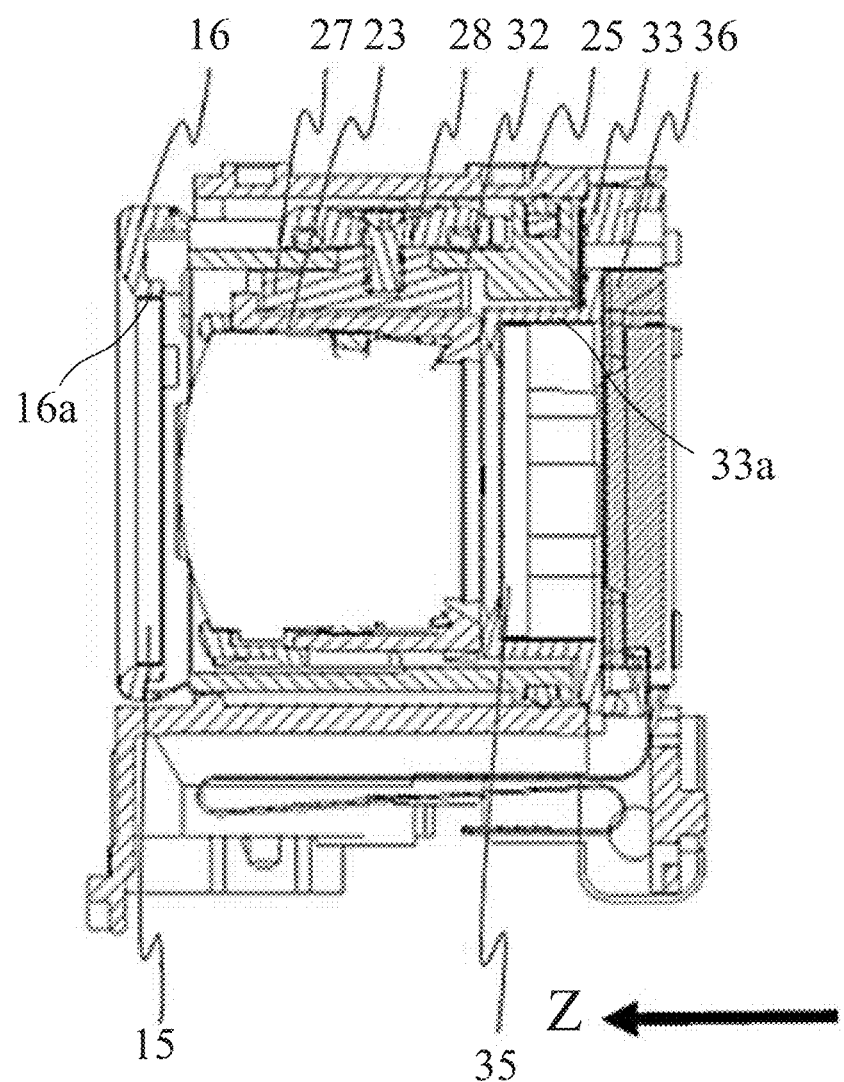
FIG. 7 is a sectional view of the electronic viewfinder unit in the storage state in this embodiment.
Figure 8:
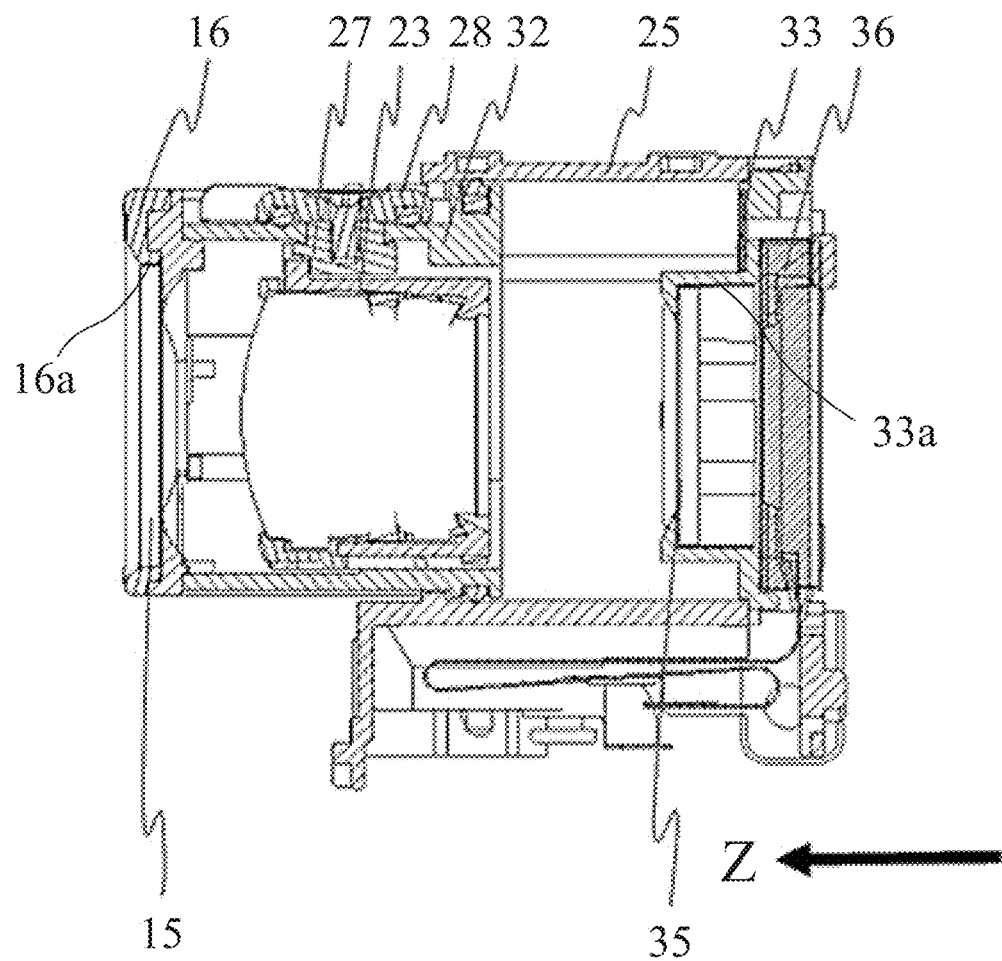
FIG. 8 is a sectional view of the electronic viewfinder unit according to this embodiment in the use or drawn state.
Figure 9:
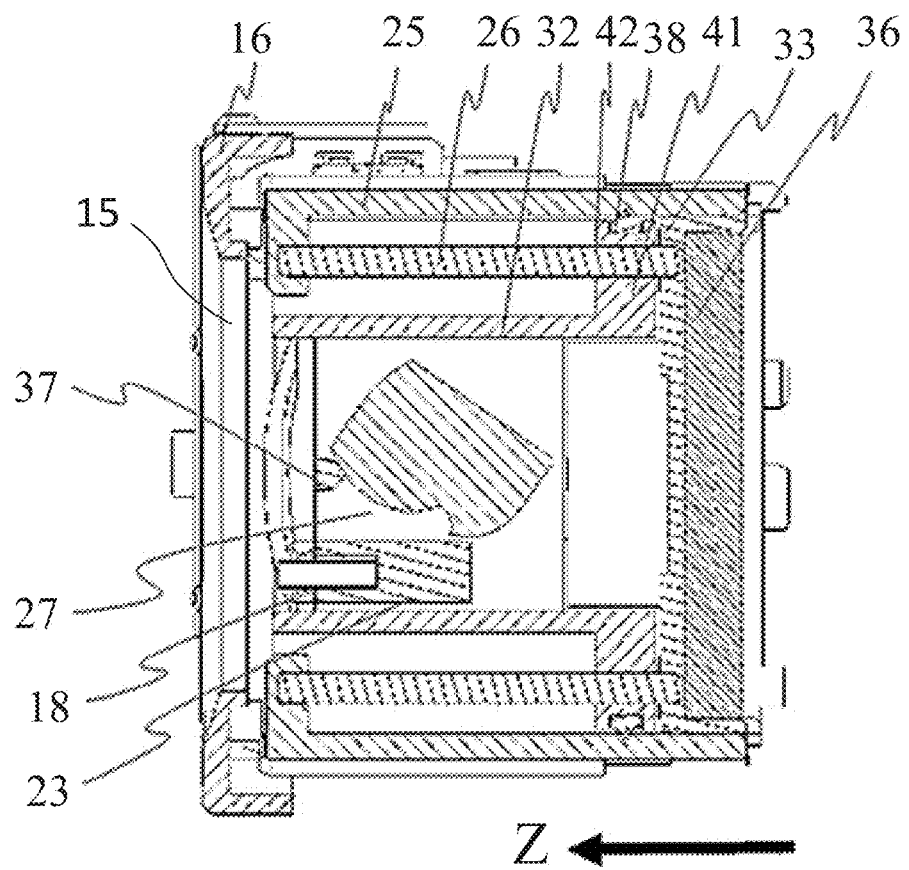
FIG. 9 is a sectional view at a position of a guide bar in the retracted state of the electronic viewfinder unit according to this embodiment.
Figure 10:
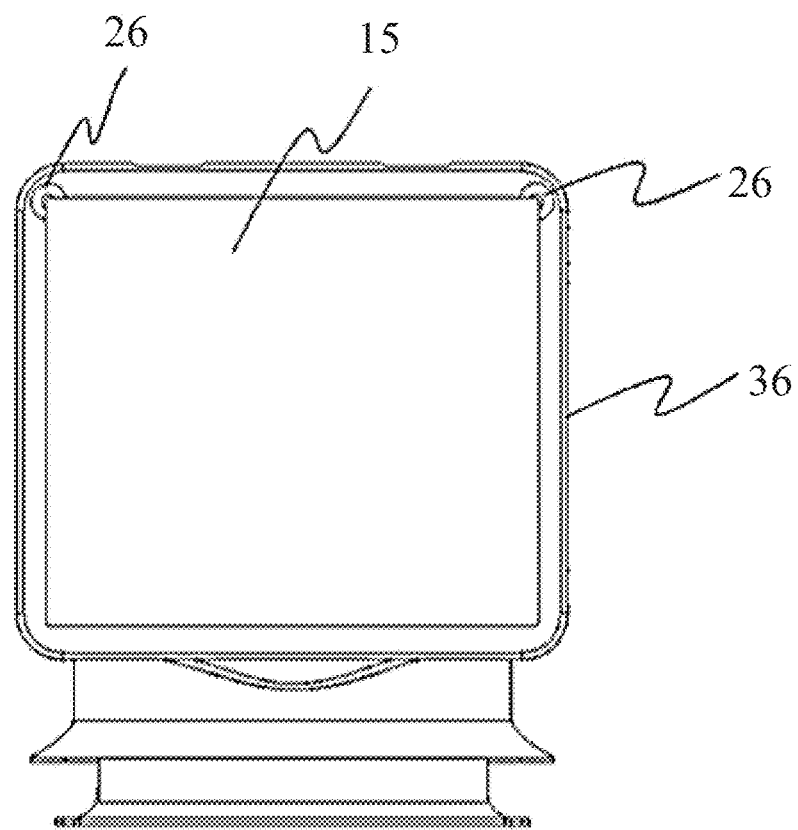
FIG. 10 is a projection view of eyepiece glass, the guide bar, and a display panel according to this embodiment when viewed from a plus side in an optical axis direction (Z axis).
Figure 11:
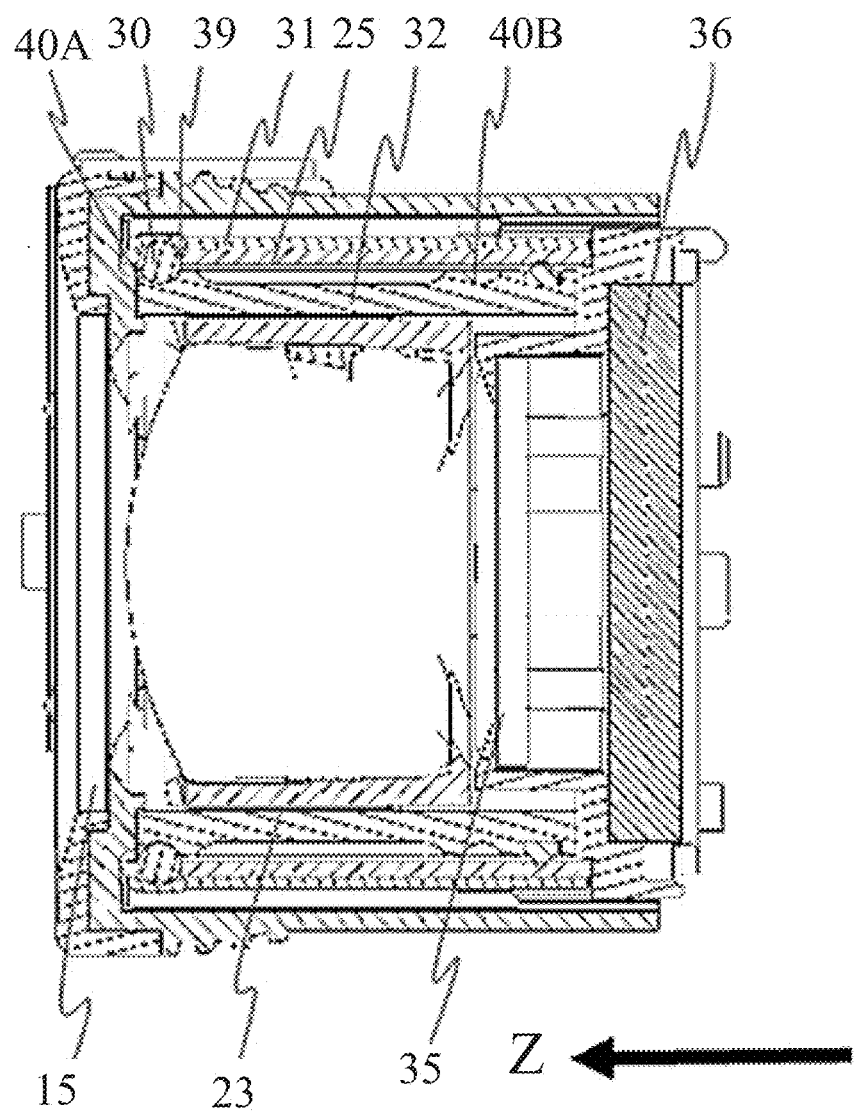
FIG. 11 is a sectional view at the position of the ball in the retracted state of the electronic viewfinder unit according to this embodiment.

FIG. 6 is an exploded perspective view of the electronic viewfinder unit 14. FIG. 7 is a sectional view of the electronic viewfinder unit 14 in the retracted state. FIG. 8 is a sectional view of the electronic viewfinder unit 14 in the use or drawn state. FIG. 9 is a sectional view at the position of a guide bar 26 when the electronic viewfinder unit 14 is retracted. FIG. 10 is a projection view of eyepiece glass 15, the guide bar 26, and the display panel 36 as seen from the plus side in the optical axis direction (Z axis). FIG. 11 is a sectional view at the position of a ball 30 when the electronic viewfinder unit 14 is retracted.

Reference numeral 23 is a third cylindrical member (lens holder) that holds the first lens 22, the mask 21, and the second lens 20. The third cylindrical member 23 is engaged with and fixes the lens cover 19 to hold and fix the first lens 22, the mask 21, and the second lens 20. The third cylindrical member 23 has a cam follower 37, and an engagement groove portion is provided in the second cylindrical member (sliding cylinder) 32 to guide the third cylindrical member 23 in the Z direction. The diopter adjustment lever 28 for adjusting the diopter, an O-ring 29, and a cam 27 are arranged above the second cylindrical member 32. A spring 18 for biasing the cam follower 37 of the third cylindrical member 23 against the cam 27 is provided between the fourth cylindrical member 16 and the third cylindrical member 23. The third cylindrical member 23 can be moved in the Z direction (optical axis direction) relative to the second cylindrical member 32 by moving the diopter adjustment lever 28.

The second cylindrical member 32 has a guide hole 42 through which the guide bar 26 penetrates. The guide bar 26 is disposed between the first cylindrical member (fixed cylinder) 25 and a panel cover 33, and fixed and supported by two members, i.e., the first cylindrical member 25 and the panel cover 33. The second cylindrical member 32 is movable in the Z direction (optical axis direction) along the guide bar 26 relative to the first cylindrical member 25. A silicone rubber (sealing member) 38 is disposed between the first cylindrical member 25 and the second cylindrical member 32 for sliding while sealing the gap between them. A ball hole 39 and a ball groove 40 which the ball 30 for restricting the position of the retracted state and the use or drawn state enters are formed in the first cylindrical member 25 and the second cylindrical member 32, respectively. Where the ball 30 enters the ball hole 39 and the ball groove 40, the position of the second cylindrical member 32 relative to the first cylindrical member 25 is restricted by biasing the ball 30 with a leaf spring 31. The fourth cylindrical member 16 and the second cylindrical member (sliding cylinder) 32 are coupled by the snap fit, and the fourth cylindrical member 16 is drawn to the Z direction (optical axis direction) and thereby becomes in the drawn or use state as illustrated in FIG. 5.

A switch (or first detector) 24 is fixed onto the first cylindrical member 25. The switch 24 is disposed at a position where the switch can be switched so as to detect whether the fourth cylindrical member 16 (and the second cylindrical member 32) is in the retracted state or in the drawn or used state.

Figure 12:
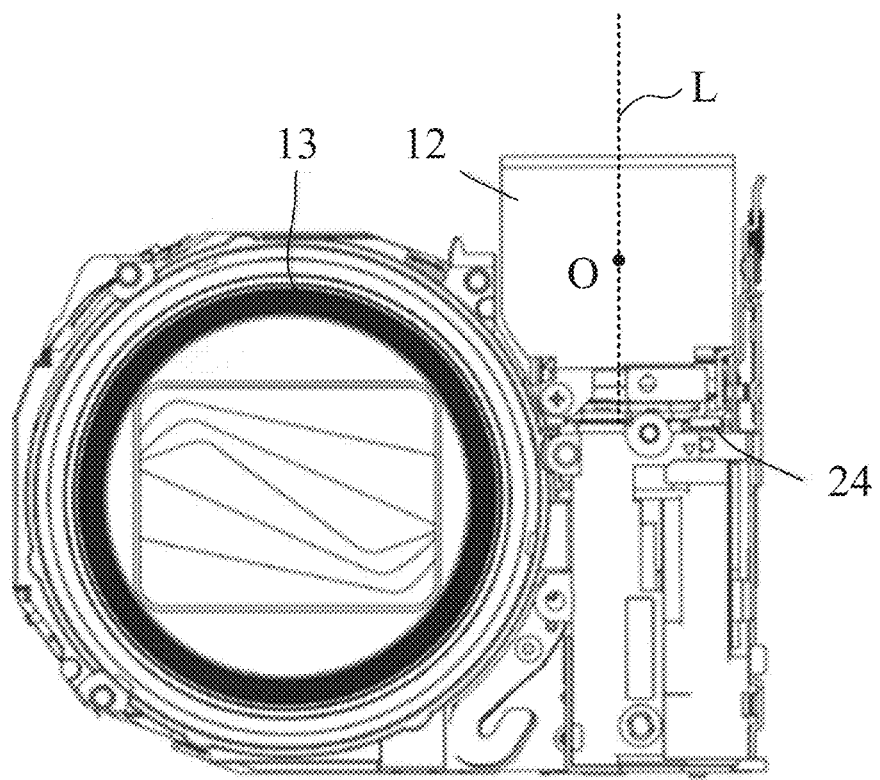
FIG. 12 illustrates the electronic viewfinder unit and the lens barrel unit according to this embodiment when viewed from an object side.
Figure 13:
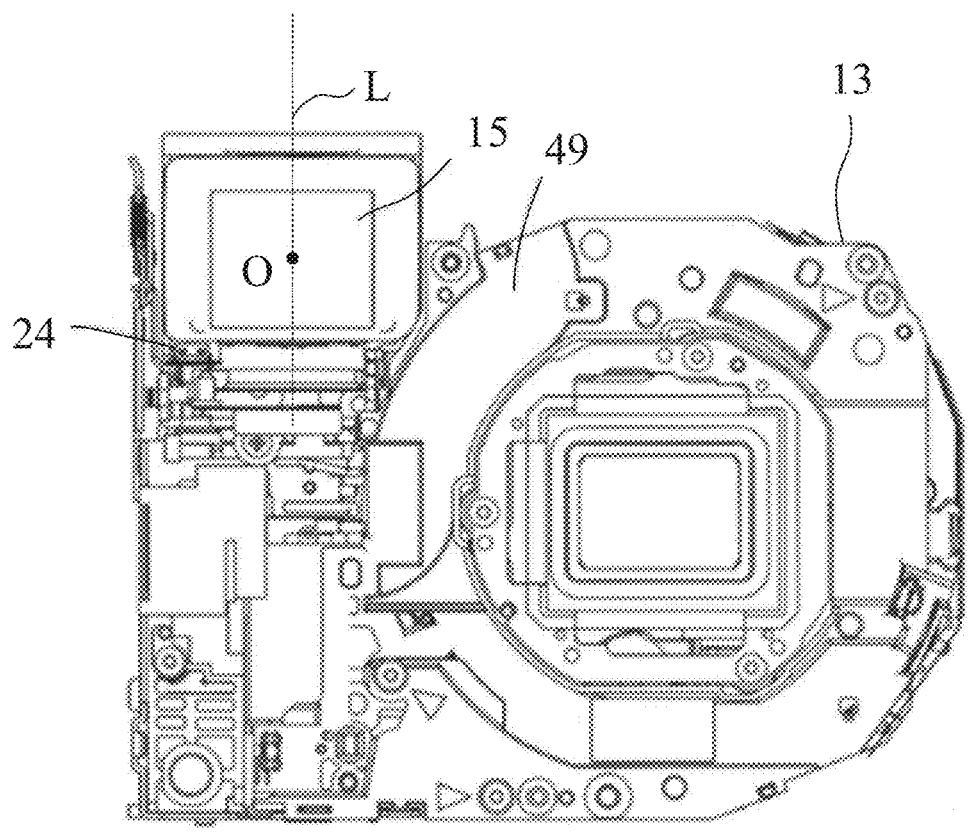
FIG. 13 illustrates the electronic viewfinder unit and the lens barrel unit according to this embodiment when viewed from an imaging surface side.

Referring now to FIGS. 12 and 13, a description will be given of a relationship between the electronic viewfinder unit 14 and the lens barrel unit 13 including the imaging optical system. FIG. 12 illustrates the electronic viewfinder unit 14 and the lens barrel unit 13 when viewed from the object side. FIG. 13 illustrates the electronic viewfinder unit 14 and the lens barrel unit 13 when viewed from the imaging surface side.

As illustrated in FIGS. 12 and 13, the switch 24 is disposed in a space on the side far from the lens barrel unit 13 inside the first cylindrical member (fixed cylinder) 25. In other words, the switch 24 is fixed inside the first cylindrical member 25, and disposed at a position distant from the lens barrel unit 13 than a reference line L passing through a center O of the first cylindrical member 25 when viewed from the optical axis direction. Since the position of the wiring inside the electronic viewfinder unit 14 and the switch 24 are close to each other, this configuration is advantageous to the wiring. A sensor holder 49 is a component that has the largest outermost shape inside the lens barrel unit 13 and is located on the plus or rear side in the Z-axis direction. The sensor holder 49 and the electronic viewfinder unit 14 are in an oblique positional relationship when viewed from the front-rear direction, and are adjacent to each other with a slight gap. Hence, if the switch 24 is disposed near them, the distance between the lens barrel unit 13 and the electronic viewfinder unit 14 becomes long and the entire digital camera 10 becomes large. Thus, this embodiment disposed the switch 24 at a position below the electronic viewfinder unit 14 that is the farthest from the sensor holder 49 of the lens barrel unit 13.

Figure 14:
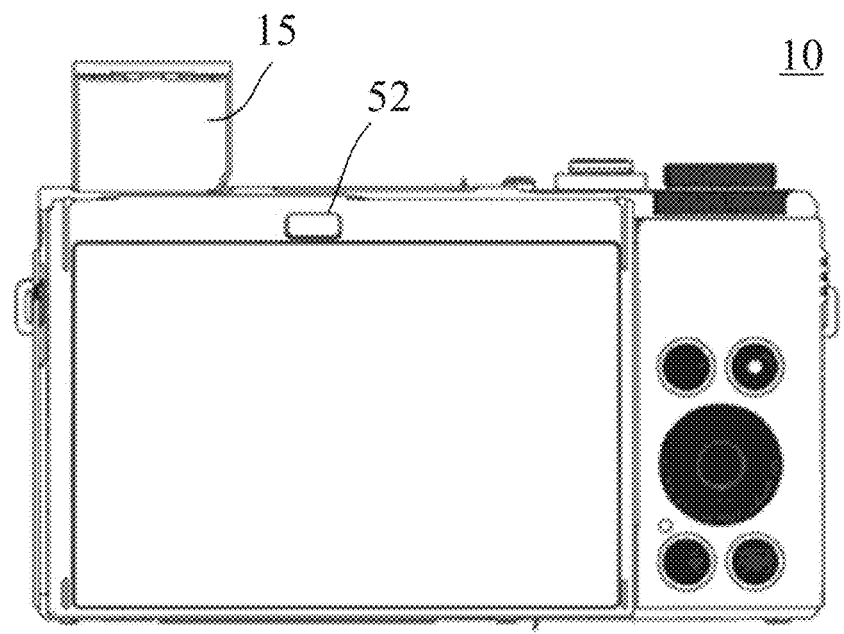
FIG. 14 illustrates the digital camera according to this embodiment when viewed from a rear surface side (display screen side of the electronic viewfinder unit and the LCD unit).
Figure 15:
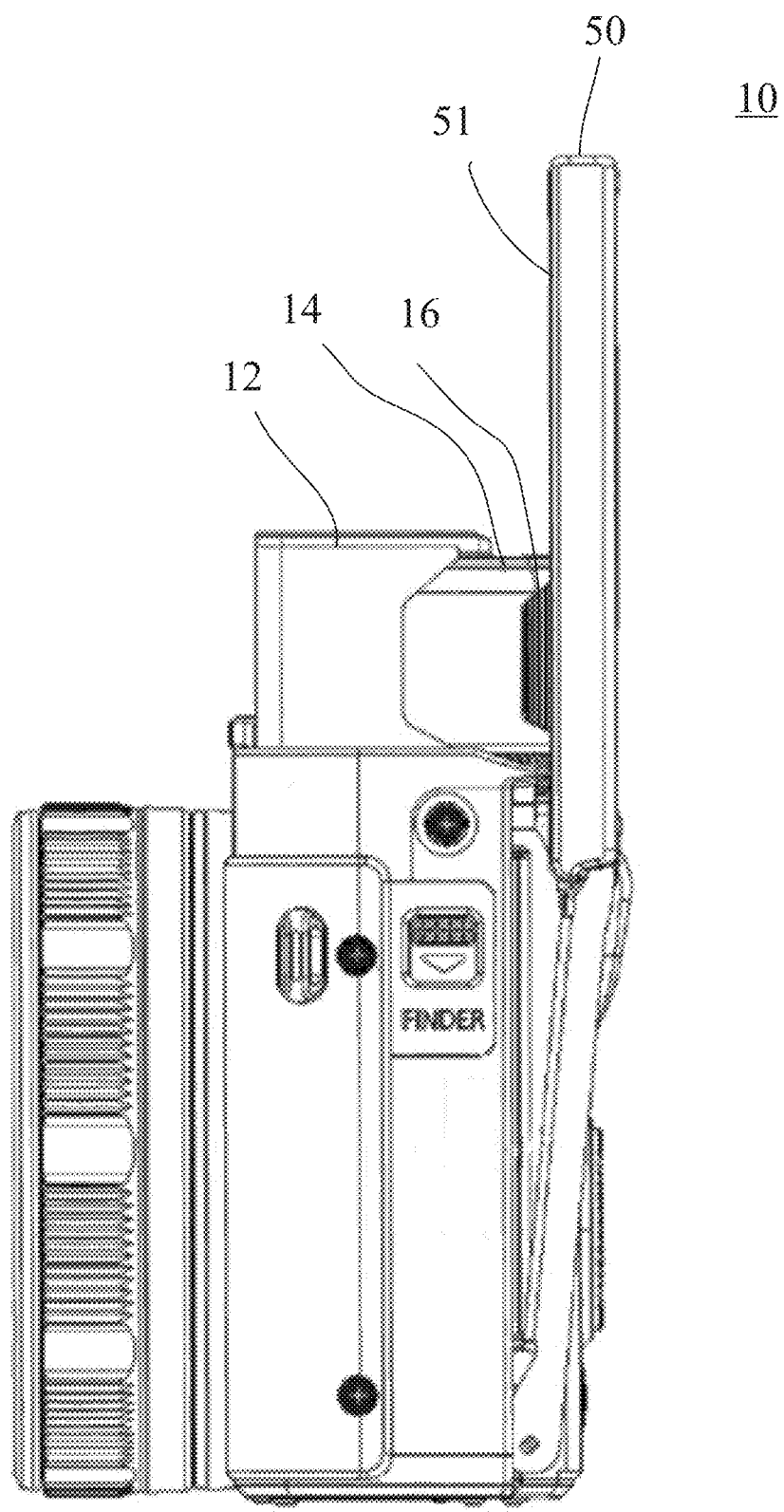
FIG. 15 illustrates a state where the LCD unit of the digital camera according to this embodiment is tilted by 180°.

Referring now to FIGS. 14 and 15, a description will be given of a relationship between the electronic viewfinder unit 14 of the digital camera 10 and an LCD unit 50. FIG. 14 illustrates the digital camera 10 when viewed from the rear side (display screen side of the electronic viewfinder unit 14 and the LCD unit 50). FIG. 15 illustrates the LCD unit 50 tilted by 180°.

In the retracted state, only a screen of a LCD panel (second display unit) 51 in the LCD unit 50 can be seen. On the other hand, in FIG. 14, the electronic viewfinder unit 14 is viewed side by side with the pop-up unit 12 (electronic viewfinder unit 14) popped up (popped-up state), but the screen of the LCD panel 51 of the LCD unit 50 is effectively displayed. An eye sensor (eyepiece detector or second detector) 52 is attached to the LCD unit 50. The eye sensor 52 can detect that the face has approached when the face approaches and the user looks into the electronic viewfinder unit 14. Thereby, the electronic viewfinder unit 14 can validate the display only when the user pops it up and the user's face approaches and views the eyepiece. On the other hand, when the display of the LCD panel 51 is turned off, the power consumption can be reduced (power saving) by turning on the display of only one of them.

As illustrated in FIG. 15, when the LCD panel 51 is tilted, the electronic viewfinder unit 14 is pushed by the LCD panel 51 in the housed direction. Thus, before the eye sensor 52 reacts, the fourth cylindrical member (eyepiece) 16 of the electronic viewfinder unit 14 is pushed by the LCD panel 51 that has tilted and rotated by 180°. Thereby, the switch 24 for detecting the retracted state is turned off, and an image is displayed on the LCD panel 51. At this time, the switch 24 is turned off, and thereby the eyepiece detection is unnecessary. Hence, the power consumption of the eye sensor 52 can be reduced by turning off the power supply of the eye sensor 52. Thus, the display state of the LCD panel 51 is always maintained without operating the electronic viewfinder unit 14.

As illustrated in FIGS. 6 to 8, the fourth cylindrical member 16 and the panel cover 33 have openings 16*a* and 33*a* for viewing an image displayed on the display panel 36, respectively. A transparent eyepiece glass 15 is fixed into the opening 16*a* in the fourth cylindrical member 16 in order to prevent foreign dust from entering, from adhering to the lens portion and the like, and from hindering the satisfactory view. The display panel 36 is fixed to and supported by the panel cover 33. A dustproof glass 35 is fixed onto the opening 33*a* of the panel cover 33 in order to prevent foreign dust from adhering to the surface of the display panel 36. The thus-configured electronic viewfinder unit 14 can seal a space between the display panel 36 and the eyepiece glass 15 from the dust. The panel cover 33 has an opening 33*b* for the ventilation, and the opening 33*b* is covered with a ventilation sheet 34 that allows only fine dust smaller than 1 μm to pass through it. This is to prevent the air containing dust and the like from entering and exiting through a minute gap due to a sudden change in the pressure of the sealed space when the user draws or uses or houses. A sudden change in the pressure of the sealed space can be mitigated by the venthole formed by the vent sheet 34.

As illustrated in FIGS. 7 and 8, there are three cylindrical members that includes the fourth cylindrical member 16 and relatively move together relative to the first cylindrical member 25 by drawing the fourth cylindrical member 16 in the Z direction (optical axis direction). The three cylindrical members include the fourth cylindrical member 16, the second cylindrical member 32 disposed inside the fourth cylindrical member 16 and joined by snap fitting, and the third cylindrical member 23 disposed inside and key-engaged with the second cylindrical member 32. The third cylindrical member 23 is movable in the optical axis direction (Z axis) relative to the second cylindrical member 32 by operating the diopter adjustment lever 28.

As illustrated in FIG. 9, an overhang portion 41 is provided on the outer circumferential portion of the second cylindrical member 32 that slides relative to the first cylindrical member 25. The overhang portion 41 has the guide hole 42 for the guide bar 26. The guide bar 26 is disposed between the first cylindrical member 25 and the panel cover 33, and fixed and supported by a double-supported configuration. The first cylindrical member 25 and the panel cover 33 are engaged with and fixed to each other. Since the second cylindrical member 32 is moved relative to the first cylindrical member 25 along the guide bar 26 fixed at both ends, the second cylindrical member 32 can be moved with high accuracy.

The silicone rubber (sealing member) 38 disposed on the entire outer circumferential portion including the projecting portion 41 and perpendicular to the optical axis direction (Z axis) slides while sealing the gap between the first cylindrical member 25 and the second cylindrical member 32. The guide bar 26 is disposed inside the projection surface of the display panel 36 in the optical axis direction (Z axis).

As illustrated in FIG. 10, the guide bar 26 is disposed outside the projection surface of the eyepiece window (eyepiece glass 15), and the guide bar 26 is disposed inside the projection surface of the display panel 36. With such an arrangement, the member disposed on the outer peripheral portion of the display panel 36 can be thinner than the configuration of the guide bar 26 disposed outside the projection surface of the display panel 36. Hence, the outer shape can be smaller in the width direction (sectional direction in FIG. 11) and in the height direction (sectional direction in FIG. 4). The cam follower 37 is pressed against the cam 27 by the spring 18 that biases the third cylindrical member 23 in the minus direction of the optical axis (Z axis).

As illustrated in FIG. 11, the position of the second cylindrical member 32 that slides relative to the first cylindrical member 25 in the optical axis direction (Z-axis) is restricted by a ball hole 39 provided to the first cylindrical member 25, and two ball grooves 40A and 40B provided in the second cylindrical member 32. In the retracted state in FIG. 10, the ball 30 is engaged with the ball hole 39 and the ball groove 40A and the position is restricted by biasing the ball 30 in a direction orthogonal to the optical axis direction (Z axis) by the leaf spring 31 disposed outside the ball 30. On the other hand, in the use or drawn state, while the ball 30 is fitted in the ball groove 40B disposed in the minus side of the optical axis direction (Z axis) of the ball hole 39 and the ball groove 40A, similar to the retracted state, the position is regulated by forcing the ball 30 with the leaf spring 31.

Thus, in this embodiment, the image pickup apparatus (digital camera 10) includes the lens barrel unit 13 having the imaging optical system, the first cylindrical member 25, and the second cylindrical member 32 movable relative to the first cylindrical member along the guide bar 26 between retracted position and the drawn position. The image pickup apparatus further includes a diopter adjuster (diopter adjusting lever 28) provided on the second cylindrical member, a first detector (switch 24) that detects whether the second cylindrical member is located at the retracted position or the drawn position, and a first display unit (display panel 36). The guide bar is formed inside the projection surface of the first display unit when viewed from the optical axis direction. The first detector is fixed onto the first cylindrical member and, when viewed from the optical axis direction, is located farther from the lens barrel unit than the reference line L passing through the center O of the first cylindrical member.

The second cylindrical member may have the overhang portion 41, which has the guide hole 42 through which the guide bar passes. The reference line L is a line in the vertical direction of the image pickup apparatus (the vertical direction in FIGS. 12 and 13). The first display unit is disposed at a diagonal position of the lens barrel unit in the image pickup apparatus. The first detector is disposed opposite to the lens barrel unit with respect to the first display unit.

The first detector may be a switch fixed onto the first cylindrical member. The image pickup apparatus may include the third cylindrical member 23 that holds the lens (first lens 22 and second lens 20). The third cylindrical member is movable in the optical axis direction relative to the second cylindrical member by the diopter adjuster. The image pickup apparatus may include the fourth cylindrical member 16 coupled to the second cylindrical member. An eyepiece member (eyepiece glass 15) is fixed to the opening 16a in the fourth cylindrical member. The first display unit may be provided inside the electronic viewfinder unit 14. The image pickup apparatus may include the second display unit (LCD panel 51) configured to tilt and rotate, and the second detector (eye sensor 52) that detects the eyepiece state of the user. The first detector may detect that the second cylindrical member is located at the retracted position before the second detector reacts when the second display unit tilts and rotates.

As described above, the digital camera 10 according to this embodiment includes the switch 24 that detects a housed status (the retracted state or the drawn or use state) of the electronic viewfinder unit 14. The power can be saved by controlling on and off of the display of the electronic viewfinder unit 14 based on the detection result of the sensor. This embodiment can provide a compact image pickup apparatus having an electronic viewfinder. The present invention is applicable not only to a digital camera but also to other image pickup apparatuses such as a digital video camera including an electronic viewfinder unit.

The present invention provides the compact image pickup apparatus having an electronic viewfinder.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-002257, filed on Jan. 10, 2019, which is hereby incorporated by reference herein in its entirety.

What is claimed is:

1. An image pickup apparatus comprising:
a lens barrel unit including an imaging optical system;
a first cylindrical member disposed outside the lens barrel unit when viewed from an optical axis direction;
a second cylindrical member disposed inside the first cylindrical member and movable relative to the first cylindrical member along a pair of guide bars between a retracted position and a pop-up position;
a diopter adjuster provided on the second cylindrical member;
a first detector fixed onto the first cylindrical member and configured to detect that the second cylindrical member is located at the retracted position or the pop-up position;
a third cylindrical member configured to hold a lens, disposed inside the second cylindrical member, and movable in the optical axis direction relative to the second cylindrical member by the diopter adjuster;
a first display unit disposed at a diagonal position of the lens barrel unit;
a fourth cylindrical member disposed outside the first cylindrical member, and coupled to the second cylindrical member, an eyepiece unit being fixed into an opening of the fourth cylindrical member;
a second display unit configured to tilt and rotate with respect to a main body of the image pickup apparatus; and
a second detector configured to detect an eyepiece state of a user,
wherein the pair of guide bars are disposed at positions in a space between the first cylindrical member and the second cylindrical member, and is formed inside a projection surface of the first display unit when viewed from the optical axis direction,
wherein the first detector is more distant from the lens barrel unit than a reference line that passes a center of the first cylindrical member when viewed from the optical axis direction, and
wherein the pair of guide bars is disposed at positions opposite to the first detector with respect to a line orthogonal to the reference line when viewed from the optical axis direction,
wherein the first detector is disposed at a position in a space between the first cylindrical member and the fourth cylindrical member, the position being opposite to the lens barrel unit with respect to the first display unit, and
wherein the first detector detects that the second cylindrical member is located at the retracted position before the second detector reacts when the second display unit tilts and rotates with respect to the main body of the image pickup apparatus.

2. The image pickup apparatus according to claim 1, wherein the second cylindrical member includes an overhang portion having a guide hole through which the guide bar passes.

3. The image pickup apparatus according to claim 1, wherein the reference line is a vertical line of the image pickup apparatus.

4. The image pickup apparatus according to claim 1, wherein the first detector is a switch fixed to the first cylindrical member.

5. The image pickup apparatus according to claim 1, wherein the first display unit is provided inside an electronic viewfinder unit.

* * * * *